(12) United States Patent
Horner et al.

(10) Patent No.: US 7,172,030 B2
(45) Date of Patent: Feb. 6, 2007

(54) APPLICATIONS OF WASTE GAS INJECTION INTO NATURAL GAS RESERVOIRS

(75) Inventors: W. Norval Horner, Calgary (CA); David A. Guichon, Calgary (CA); Arthur Danielson, Calgary (CA); Dennis A. Beliveau, Calgary (CA)

(73) Assignee: Beavert Gas Services Ltd., Calgary (CA)

( * ) Notice: Subject to any disclaimer, the term of this patent is extended or adjusted under 35 U.S.C. 154(b) by 219 days.

(21) Appl. No.: 10/957,582

(22) Filed: Oct. 5, 2004
(Under 37 CFR 1.47)

(65) Prior Publication Data
US 2005/0167103 A1 Aug. 4, 2005

(51) Int. Cl.
E21B 43/22 (2006.01)
(52) U.S. Cl. .................................... 166/402
(58) Field of Classification Search ............... 166/401, 166/402, 403
See application file for complete search history.

(56) References Cited

U.S. PATENT DOCUMENTS

| | | | |
|---|---|---|---|
| 3,653,438 A | 4/1972 | Wagner | |
| 3,661,208 A | 5/1972 | Scott et al. | |
| 3,687,198 A | 8/1972 | Hearn et al. | |
| 3,809,159 A | 5/1974 | Young et al. | |
| 3,811,502 A | 5/1974 | Burnett | |
| 3,964,545 A | 6/1976 | Speller, Jr. | |
| 3,995,693 A | 12/1976 | Cornelius | |
| 4,042,029 A | 8/1977 | Offeringa | |
| 4,099,568 A | 7/1978 | Allen | |
| 4,149,598 A | 4/1979 | Christian | |
| 4,187,910 A | 2/1980 | Cornelius et al. | |
| 4,217,956 A | 8/1980 | Goss et al. | |
| 4,374,544 A | 2/1983 | Westerman et al. | |
| 4,375,238 A | 3/1983 | Parsons | |
| 4,393,936 A | 7/1983 | Josendal | |
| 4,623,283 A | 11/1986 | Chew | |
| 4,635,721 A | 1/1987 | Sheffield et al. | |

(Continued)

FOREIGN PATENT DOCUMENTS

WO WO 00/11313 3/2000

(Continued)

OTHER PUBLICATIONS

SPE Paper 1240; Secondary Recover of Natural Gas, Stinson; Oct. 1965.

(Continued)

Primary Examiner—William Neuder
(74) Attorney, Agent, or Firm—Sean W. Goodwin (57) ABSTRACT

Natural gas is produced from a reservoir above a bitumen reserve with minimal or no impact on concurrent or subsequent production of bitumen recovery techniques including SAGD. Greenhouse benefits over and above the benefits of coincidental recovery are available through the injection of waste gas containing carbon dioxide for maintaining pressure in the gas reservoir while producing natural gas. Carbon dioxide separates out of the waste gas through preferential absorption in connate or aquifer water, with the result that carbon dioxide is thereby both retarded from flowing to the natural gas production well and effectively sequestered in the reservoir water. Additional advantage is achieved wherein water influx at production wells can be managed and trapped gas can be recovered.

35 Claims, 8 Drawing Sheets

Coincidental Waste Gas EGR and in situ $CO_2$ separation and sequestration employing aquifer water and gravity.

U.S. PATENT DOCUMENTS

| | | | |
|---|---|---|---|
| 4,711,306 A | 12/1987 | Bobo | |
| 4,726,759 A | 2/1988 | Wegener | |
| 4,741,398 A | 5/1988 | Goldsberry | |
| 4,794,987 A | 1/1989 | Kokolis et al. | |
| 5,060,730 A | 10/1991 | Kisman et al. | |
| 5,062,483 A | 11/1991 | Kisman et al. | |
| 5,085,274 A | 2/1992 | Puri et al. | |
| 5,099,921 A | 3/1992 | Puri et al. | |
| 5,261,490 A | 11/1993 | Ebinuma | |
| 5,267,615 A | 12/1993 | Christiansen et al. | |
| 5,297,627 A | 3/1994 | Sanchez et al. | |
| 5,388,640 A | 2/1995 | Puri et al. | |
| 5,439,054 A | 8/1995 | Chaback et al. | |
| 5,454,666 A | 10/1995 | Chaback et al. | |
| 5,607,016 A | 3/1997 | Butler | |
| 5,725,054 A | 3/1998 | Shayegi et al. | |
| 5,769,165 A | 6/1998 | Bross et al. | |
| 6,119,776 A | 9/2000 | Graham et al. | |
| 6,125,936 A | 10/2000 | Swisher | |
| 6,318,468 B1 | 11/2001 | Zakiewicz | |
| 6,321,840 B1 | 11/2001 | Billiter et al. | |
| 6,412,559 B1 | 7/2002 | Gunter et al. | |
| 6,450,256 B2 | 9/2002 | Mones | |
| 6,543,535 B2 * | 4/2003 | Converse et al. | 166/246 |
| 6,598,398 B2 | 7/2003 | Viteri et al. | |

FOREIGN PATENT DOCUMENTS

| | | | |
|---|---|---|---|
| WO | WO 01/61167 | | 8/2001 |
| WO | WO 2004/055323 | * | 7/2004 |

OTHER PUBLICATIONS

CIM Paper CIM93-70; Enhanced gas recovery: Prospects and Technology; Kokal et al; May 1993.

SPE Paper 39637; A small independent producer's design, construction and operation of a flue gas injection project, East Edna Field, Okmulgee County, Oklahoma; Godwin et al; Apr. 1998.

Papay, J.; Improved Recovery of Convention of Natural Gas Part 1: Theoretical discussion of Recovery Methods; Reservoir Engineering; Jun. 1999; p. 302-308.

Papay. J.; Improved recovery of Convention Natural gas Part 2: results of a Pilot Test; Reservoir Engineering Jul.-Aug. 1999; p. 354-355.

SPE Paper 58981; Gas injection as a method for improved gas recovery in gas-condensate reservoirs with active support; Lopez; Feb. 2000.

Oldenburg et al; Process modeling of $CO_2$ injection into natural gas reservoirs for carbon sequestration and enhanced gas recovery; Energy & Fuels 2001, 15, 293-298 (Oct. 2000).

Oldenburg et al: Carbon sequestration with enhanced gas recovery: Identifying candidate sites for pilot study;p. 1-11; 2001-2002.

SPE Paper 74367; CO2 injection for enhanced gas production and carbon sequestration: Oldenburg et al; Feb. 2002.

OPTI Canada Inc./ Nexen Canada Ltd. EUB Supplemental Information p. 32-40 and p. 62-70; Jul. 2002.

SPE Paper 77347; Enhanced gas recovery by carbon dioxide sequestration in depleted reservoirs; Mamora et al.; Oct. 2002.

Enhanced Gas Recovery and CO2 Storage for Alberta Gas Pools, PTAC Technology Information Session; Alberta Research Council Inc.; Mar. 18, 2003; 43 pages.

Todesco, D.M. Gas over Bitumen?-Bitumen over gas!—Date unknown but later than Jan. 2004 release of "Lexpert"—see p. 15.

Thambimuthu et al.; Canadian initiatives on CO2 capture and storeage: towards zero emissions from fossil fuels; Date unknown -post 2001.

Gunter et al.; Aquifer disposal of CO2-rich gases—Phase 1—Original date Jul. 19, 1996 and modified Dec. 13, 2001.

* cited by examiner

Figure 1. Overhead View of Reservoir - Waste Gas pressure pulse and physical displacement over time - PRIOR ART Figure 2. Waste Gas Enhanced Gas Recovery Process - PRIOR ART Figure 3. Coincidental Waste Gas EGR and in situ $CO_2$ separation and sequestration employing connate reservoir water.

Figure 4. Coincidental Waste Gas EGR and in situ $CO_2$ separation and sequestration employing gravity.

Figure 5. Coincidental Waste Gas EGR and in situ $CO_2$ separation and sequestration employing aquifer water and gravity.

Figure 6. Steam Assisted Gravity Drainage Process - PRIOR ART

Figure 7. Coincidental Waste Gas EGR and pressure maintenance with concurrent SAGD operation in an associated gas-over-bitumen situation.

Figure 8. Coincidental Waste Gas EGR, re-connection of trapped gas and separation and sequestration of carbon dioxide using a horizontal Waste Gas injection well in a natural gas reservoir with an active underlying aquifer.

APPLICATIONS OF WASTE GAS INJECTION INTO NATURAL GAS RESERVOIRS

BACKGROUND

It is known that there are valuable residual reserves of natural gas that are not economically recoverable with primary production techniques. Although there has been considerable attention paid to the development and implementation of both secondary and tertiary enhanced oil recovery ("EOR") processes over the last half century, there has been comparatively little attention given to the potential for enhanced natural gas recovery ("EGR") processes. This may be due in part to the fact that conventional oil reservoirs will typically produce only 10–30% of their original oil in place under primary recovery, while most conventional natural gas reservoirs will produce 60–90% of their original gas in place through natural reservoir pressure depletion.

One of the EGR processes that has received considerable attention in technical publications is the process of injecting an inert gas such as carbon dioxide or nitrogen into a conventional natural gas reservoir for purposes of displacing residual natural gas away from injection wells and toward production wells, with the expectation that such process will result in an increase in the total quantity of natural gas ultimately recovered from the reservoir ("Gas Displacement EGR"). However, the relatively high cost of producing and injecting a concentrated or near-purity stream of either carbon dioxide or nitrogen has been a factor that has inhibited the commercial adoption of Gas Displacement EGR using those gases.

Recent developments in the field suggest that flue gas and other gaseous effluent emitted from any of a range of industrial facilities could provide a more cost effective displacement agent for Gas Displacement EGR. Such effluent ("Waste Gas") may contain any one or more of carbon dioxide, nitrogen, oxygen, sulphur dioxide, nitrous oxide, nitrogen dioxide and other substances. "Waste Gas EGR" is described as a process for increasing the quantities of methane and associated hydrocarbon gases ("natural gas"), and in some instances associated hydrocarbon liquids, recoverable from a subterranean reservoir, through the controlled injection of Waste Gas into that reservoir. The basic principle underlying the Waste Gas EGR process is that the injection of Waste Gas into the reservoir through one or more injection wells will both increase reservoir pressure outward from those wells and displace residual natural gas towards wells that continue to be used for production, resulting in an increase in the amount of remaining natural gas that is ultimately recovered from the reservoir.

Figure 1:
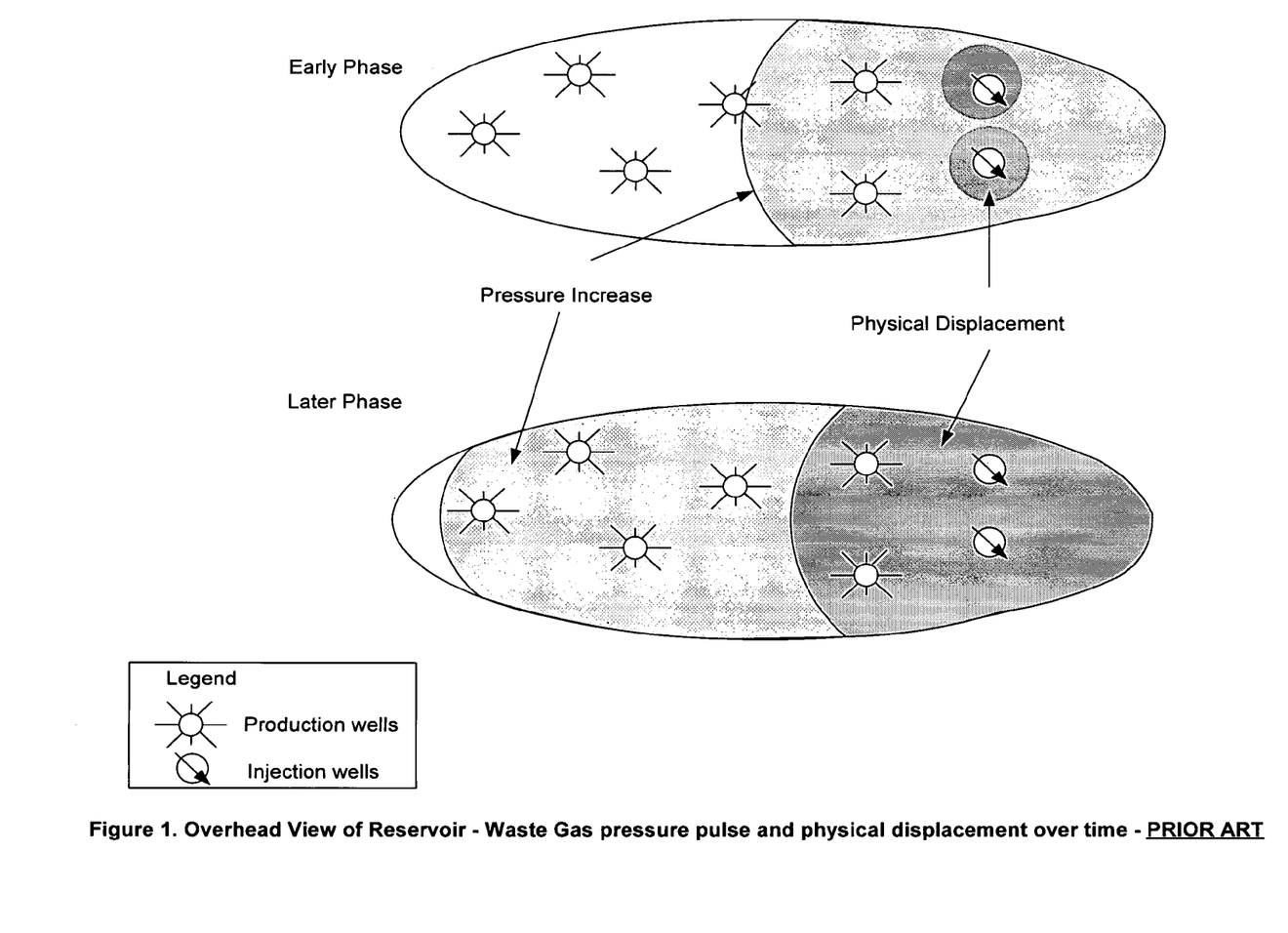
FIG. 1 is a schematic illustrating the relative effects of pressure pulse and physical displacement in a Displacement Gas EGR scheme, according to the prior art.

Because the pressure pulse resulting from Waste Gas injection will spread through the reservoir much more quickly than will the Waste Gas itself, increases in natural gas production can be expected to occur at points quite distant from the Waste Gas flood front, meaning that production wells will generally begin to experience increased natural gas production rates well before injected Waste Gas reaches them (FIG. 1). Factors such as reservoir permeability, heterogeneity, size and dimensions, as well as the presence and influence of water and the stage of primary depletion production, will all have a bearing on the effectiveness and efficiency of Waste Gas EGR in any particular reservoir situation.

Figure 2:
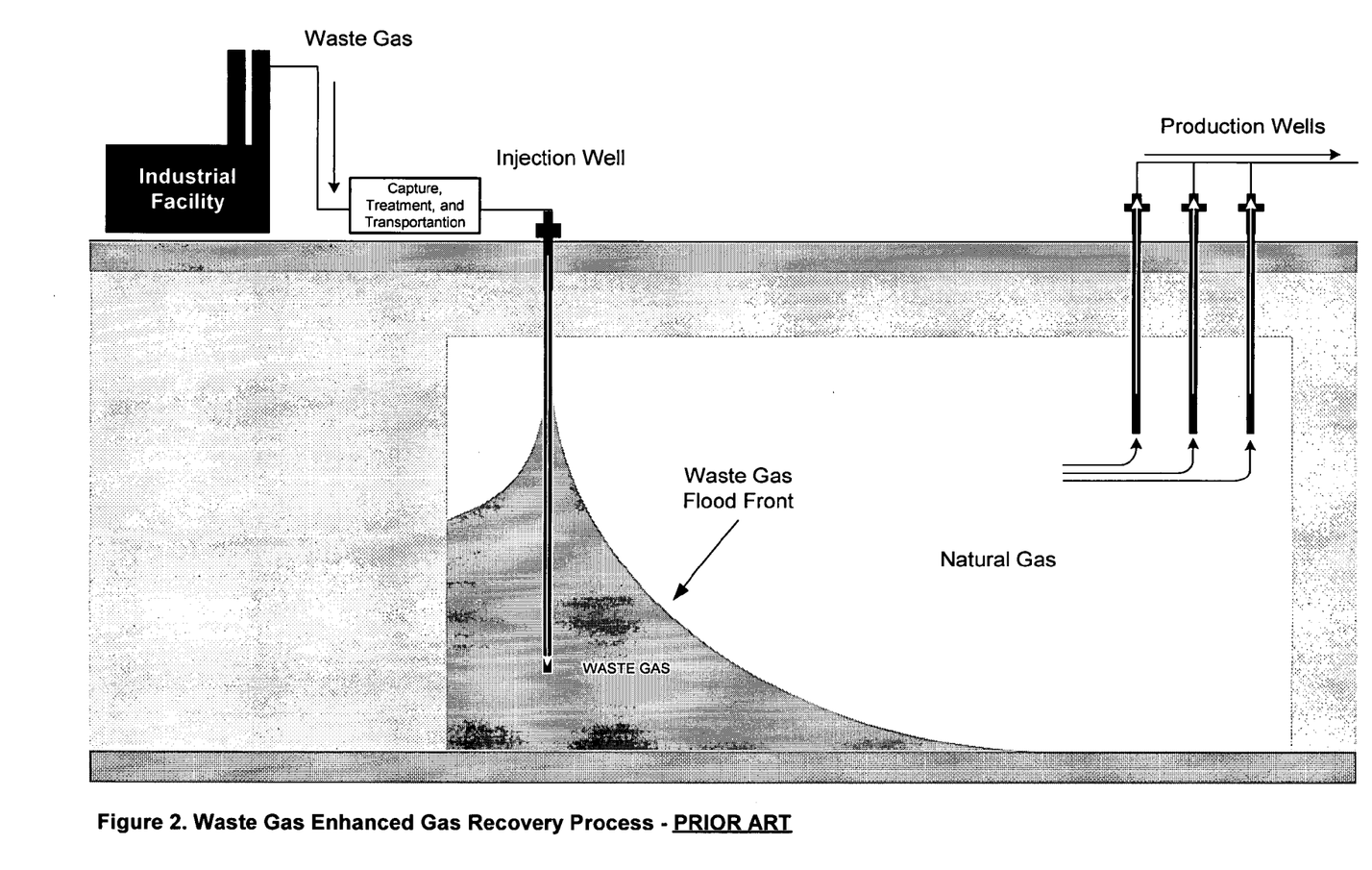
FIG. 2 is a schematic illustrating Waste Gas EGR, according to the prior art.

The primary components of a Waste Gas stream will generally be nitrogen, carbon dioxide and, in some cases, oxygen. The density and viscosity characteristics of these substances relative to those of methane make them advantageous agents for displacing or sweeping natural gas towards production wells (Table 1). Because all of the primary Waste Gas components are more viscous than methane under reservoir conditions, they will flow through the porous media constituting the reservoir less readily than will methane, thus tending to push methane ahead of them as they move through the reservoir. The primary Waste Gas components also all have higher densities (i.e., gravity) than methane, meaning that they will generally tend to remain or gravitate lower in the reservoir than methane. If injected in the lower regions of a reservoir they will accordingly tend to displace methane upwards towards the upper regions of the reservoir. The combination of these factors means that, even though all of the primary Waste Gas components are miscible with methane under reservoir conditions, Waste Gas injected into a select region of the reservoir at an appropriate pressure and rate will tend to mix with the methane in the reservoir only for a limited distance past the initial point of contact, creating a well defined fluid interface or flood front of mixed Waste Gas and methane that will push methane ahead of it as Waste Gas continues to enter the reservoir behind it (FIG. 2). Although reservoir heterogeneity will affect the uniformity of this flood front, the "fingering" or "streaking" complications that have been encountered in gas-based EOR schemes will not be as significant an issue in Waste Gas EGR because the displacement agent is more viscous, as opposed to less viscous, than the hydrocarbon being displaced. Depending on reservoir constituents, the relative solubility and reactivity of the Waste Gas components may also be significant factors in Waste Gas EGR performance.

In most instances the raw Waste Gas stream will have to be treated to remove water and any other potentially problematic substances that may be present, but as a general rule the treatment required to render Waste Gas suitable for use as a displacement agent will be much less expensive than the processing required to produce a relatively pure stream of either carbon dioxide or nitrogen from Waste Gas.

Some publications of relevance to waste gas EGR include:

Stinson, D. L., "Secondary Recovery of Natural Gas", Society of Petroleum Engineers Paper No. SPE 1240, presented at the October, 1965 SPE Annual Fall Meeting in Denver, Colo.

U.S. Pat. No. 4,393,936 filed Sep. 21, 1981 on behalf of Virgil A. Josendal (Inventor) and Union Oil Company of California (Assignee), granted in 1983.

Zotov, G. A.; Pestryakov, A. K.; Sokolov, V. A., "The Primary Principles of Determining the Optimum Constant Recovery Periods from Gas Fields", Russian Analytical Book published 1983.

Duckett, M; Banks, R; Limb, D, "Using Nitrogen to Enhance Oil and Gas Recovery", Journal World Oil, articled in July, 1983.

Clancy, J. P; Bywater, D. R.; Cheng, L. H. K.; Gilchrist, R. E., "Analysis of Nitrogen-injection Projects to Develop Screening Guides and Offshore Design Criteria", Journal J. Pet. Technol, articled in June, 1985.

Carriére, J. F.; Fasanino, G; Tek, M. R., "Mixing in Underground Storage Reservoirs", Society of Petroleum Engineers Paper No SPE-14202, 9–12, presented at September, 1985, 60th Annual Technical Conference and Exhibition of the Society of Petroleum Engineers in Las Vegas, Nev.

Laille, J. P.; Molinard, J. E.; Wents, A., "Inert Gas Injection as Part of the Cushion of the Underground Storage of Saint-Clair-Sur-Epte, France", Society of Petroleum Engineers Paper No. SPE-17740, 343–352, presented at June, 1988, SPE Gasa Technology Symposium in Dallas, Tex.

van der Burgt, M. J.; Cantle, J; Boutkan, V. K., "Carbon Dioxide disposal from coal-based IGCCs in depleted gas fields. In: Proceedings of the First International Conference on Carbon Dioxide Removal", Energy Conversion & Management, 1992, 33 (5–8), 603–610.

Kokal, S; Sayegh, S, "Enhanced Gas Recovery: Prospects and Technology", Analytical report presented at the May, 1993-44th Annual meeting of the Petroleum Society of Canadian Institute of Mining and Metallurgy (CIM) in Calgary, Alberta.

Norwegian Patent No. NO 173146/B/, filed Nov. 7, 1984 on behalf of Andreasson, E. M.; Egeli, F; Holmberg, K. A.; Nystroem, B; Stridh, K. G.; Oesterberg, E. M. (Inventors) and Berol Kemi A B, Stenungsund (Sweden); Tendex Kjemiservice A/S Stavanger (Norway) (Assignees), granted Jul. 26, 1993.

Dindoruk, B; Orr, F. M. Jr.; Johns, R. T., "Theory of Multicontact Miscible Displacement with Nitrogen", Analytical Book presented at the October, 1995—Annual meeting of the Society of Petroleum Engineers (SPE) in Dallas, Tex.

Blok, K; Williams, R. H.; Katofsky, R. E.; Hendriks, C. A., "Hydrogen Production from Natural Gas Sequestration of Recovered $CO_2$ in Depleted Gas Wells and Enhanced Natural Gas Recovery", Energy: The International Journal, 1997, 22 (2–3), 161–168.

Papay, Jozsef, "Improved Recovery of Conventional Natural Gas, Part 1: Theoretical Discussion of Recovery Methods", Journal Erdoel Erdgas Kohle, June, 1999, and "Improved Recovery of Conventional Natural Gas. Part. 2; Results of a Pilot Test", Journal Erdoel Erdgas Kohle, July/August 1999.

Oldenburg, C M; Pruess, K; Benson, S. M; (E. O. Lawrence Berkeley National Laboratory), "Process Modeling of CO2 Injection into Natural Gas Reservoirs for Carbon Sequestration and Enhanced Gas Recovery", Journal of Energy and Fuels, Vol. 15 Mar–April, 2001, presented at the August, 2000 American Chemical Society Division of Fuel Chemistry Symposium on $CO_2$ Capture in Washington, D.C.

Oldenburg, C M; Benson, S M; (E. O. Lawrence Berkeley National Laboratory), "Carbon Sequestration with Enhanced Gas Recovery: Identifying Candidate Sites for Pilot Study", (2002)

Oldenburg, C. M. and Benson, S. M., "CO2 Injection for Enhanced Gas Production and Carbon Sequestration", SPE 74367, presented at the February, 2002 SPE International Petroleum Conference.

Mamora, D. D. and Seo, J. G., "Enhanced Gas Recovery by Carbon Dioxide Sequestration in Depleted Gas Reservoirs", SPE 77347, presented at the October, 2002 SPE Annual Technical Conference, San Antonia, Tex.

Clemens, Torsten and Wit, Krijn, "CO2 Enhanced Gas Recovery Studied for an Example Gas Reservoir", SPE 77348, presented at the October, 2002 SPE Annual Technical Conference in San Antonio, Tex.

Oldenburg, C M; Stevens, S H; Benson Steve Mulherin. "Economic Feasibility of Carbon Sequestration with Enhanced Gas Recovery (SCSEGR)" Lawrence Berkely National Laboratory, Berkely, Calif. 2003 Ross, Elsie "Carbon Dioxide has Milt-Role Potential in Gas Reservoirs" New Technology Magazine, April/May 2003.

To Applicant's knowledge, the general Waste Gas EGR concept is not currently in use and is not widely recognized as viable, although the concept has been the subject of academic consideration. Some publications providing additional technical background in this respect, the entirety of which are incorporated herein by reference, are listed in Appendix A.

SUMMARY OF THE INVENTION

Herein are disclosed improved methods for applying Waste Gas EGR so as to resolve several problems with the state of the art. Without limiting the breadth of application of the invention, some specific embodiments of the invention are as follows:

In a broad aspect of the invention, a process is provided for the production of natural gas from a natural gas formation having a water presence and overlying and being in pressure communication with a bitumen reserve, the natural gas production being non-detrimental to pressure sensitive operations for the recovery of the bitumen resource, the process comprising:

providing at least one Waste Gas injection well and at least one natural gas production well, each completed in the natural gas formation;

injecting Waste Gas into the natural gas reservoir through the injection well(s) at a pressure and rate that causes the pressure in the natural gas reservoir to be maintained or increased notwithstanding the production of natural gas from the reservoir, and producing natural gas from the production well(s) without causing any reduction in reservoir pressure, thereby preserving or improving the pressure condition of the reservoir for concurrent or subsequent pressure sensitive operations for the recovery of the bitumen resource;

optionally, either concurrently or subsequently producing bitumen from the bitumen reserve using SAGD or other processes;

optionally, using a Waste Gas displacement agent that contains carbon dioxide, and conducting Waste Gas EGR injection operations so as to employ the connate or aquifer water in or in contact with the natural gas reservoir to cause carbon dioxide to be separated out of the Waste Gas displacement agent through preferential absorption in such water, with the result that carbon dioxide is thereby both retarded from flowing to the natural gas production well(s) and effectively sequestered in the reservoir water; and optionally, using a Waste Gas displacement agent that contains carbon dioxide, and conducting Waste Gas injection operations so as to cause some of the carbon dioxide in the Waste Gas displacement agent to come in contact with and be dissolved in bitumen, thereby reducing the viscosity and improving the flow capability of such bitumen.

In a preferred alternate embodiment of the invention, natural gas is produced under primary production at diminishing formation pressure until a predetermined pressure threshold is reached. Following primary production, secondary production of natural gas is conducted using Waste Gas EGR in such a manner as to maintain a pressure in the natural gas formation above the minimum bitumen recovery operational pressure. At any time before, during or after the conduct of Waste Gas EGR operations, bitumen recovery is commenced, resulting in co-production of natural gas and bitumen.

Surprisingly, Applicant has discovered that application of Waste Gas EGR techniques enables production of natural gas without compromising the concurrent or subsequent production of bitumen using conventional recovery techniques including SAGD, and Applicant has further found there to be additional synergistic effects on the bitumen reservoir resulting in enhanced production of both natural gas and of bitumen which can exceed the nominal production of either hydrocarbon resource independently.

Figure 5:
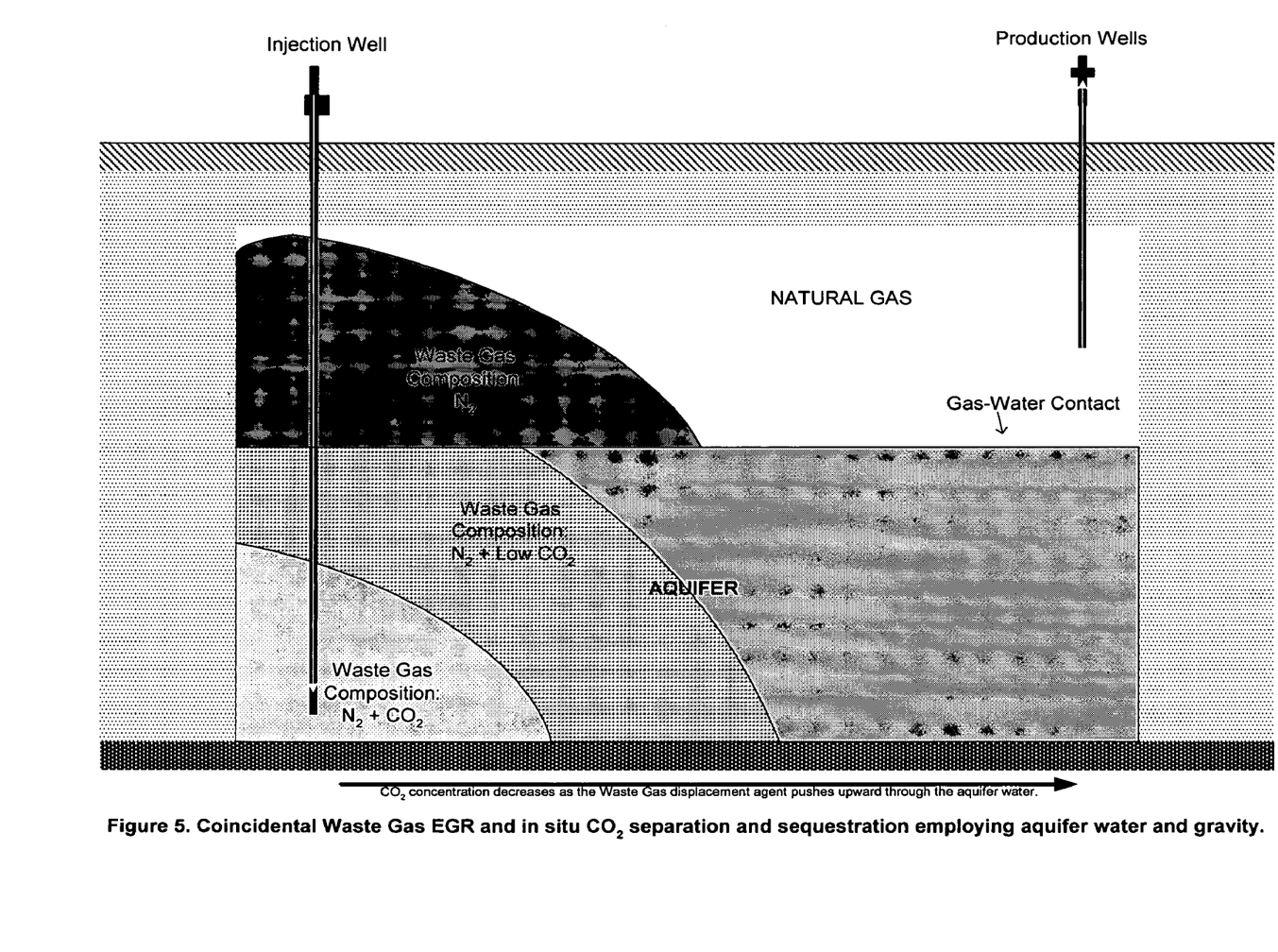
FIG. 5 is a schematic illustrating coincidental Waste Gas EGR and in situ separation and sequestration of $CO_2$ employing both aquifer water and gravity, according to another embodiment of the present invention.

In the case where a natural gas formation overlies an aquifer, the Waste Gas injection well is completed so as to provide for the injection of Waste Gas into the aquifer while the natural gas production well is completed so as to provide for production of natural gas from an area above the aquifer (FIG. 5). A Waste Gas displacement agent containing $CO_2$ and $N_2$ is injected through the injection well into the aquifer, with the Waste Gas rising through the aquifer and into the natural gas formation, generating a pressure pulse and displacing methane present in the formation toward the production well. As the Waste Gas moves upward through the aquifer, $CO_2$ is absorbed in the aquifer water and thereby separated out of the Waste Gas stream, resulting in a significant reduction in the concentration of $CO_2$ in the Waste Gas displacement agent at the flood front. Because $N_2$ is also less dense than $CO_2$, separation of the $CO_2$ out of the Waste Gas displacement agent is further assisted by the relative gravity of $CO_2$ and $N_2$. When the displacement agent eventually breaks through at the production well and begins to contaminate the natural gas being produced from that well, the contamination will be exclusively or primarily by $N_2$, with the presence of $CO_2$ being substantially and advantageously reduced or eliminated.

In the case where a natural gas reservoir contains hydrocarbons, clays or other substances that are particularly reactive with oxygen, the oxygen removal equipment that might typically be incorporated in the facilities used to treat Waste Gas to render it suitable for use as a displacement agent are excluded, resulting in the Waste Gas displacement agent containing a small percentage of oxygen. By establishing an appropriate distance and reservoir course between injection and production wells, and thereby employing both the geochemical re-constitutions resulting from the interaction of the Waste Gas oxygen with the oxygen reactive constituents of the reservoir, as well as the moderately higher viscosity, gravity and solubility of oxygen relative to nitrogen, the oxygen in the Waste Gas displacement agent will be separated out of the Waste Gas stream as it migrates through the reservoir, resulting in a significant reduction in the concentration of oxygen in the Waste Gas displacement agent at the flood front. When the displacement agent reaches the production well, it will be fully or substantially depleted of oxygen, eliminating or reducing concerns with respect to both corrosion of production equipment and facilities, and the potential for explosion or combustion.

DESCRIPTION OF THE PREFERRED EMBODIMENTS

In Situ Management of Problematic Substances Contained in Waste Gas

Over the course of the past decade the environmental concerns associated with greenhouse gas ("GHG") emissions have received increasing attention, with the 1997 Kyoto Protocol serving to focus the world's attention on the initiative to control and reduce such emissions. Carbon dioxide, which will almost always be a primary component of any Waste Gas stream, is considered the most significant anthropogenic contributor to climate change. A host of GHG emissions reduction alternatives have been proposed, including a variety of proposals focused on capturing carbon dioxide out of Waste Gas and using it for EOR, EGR or enhanced coalbed methane recovery, or simply disposing of it in depleted hydrocarbon reservoirs. However, the cost of capturing a concentrated or near-purity stream of carbon dioxide out of Waste Gas has inhibited the pursuit of such proposals.

Presently there are numerous types of commercial processes for the separation of carbon dioxide from Waste Gas. Examples of these are a process that uses a selective amine solution to strip the carbon dioxide from the other Waste Gas components, and a cryogenic process that separates carbon dioxide through condensation. Unfortunately, the current technologies for separating carbon dioxide out of Waste Gas are energy intensive and expensive. Without sufficient economic motivation to reduce or eliminate GHG emissions, the standard industrial practice is to vent Waste Gas to atmosphere.

In addition to carbon dioxide, Waste Gas may contain one or more of sulphur dioxide and various nitrogen oxides (such as nitric oxide, nitrous oxide or nitrogen dioxide), all of which are considered to be environmentally deleterious. Government regulation of industrial emissions has resulted in some reduction in the emission of these substances to atmosphere, but generally at a cost to industry.

The safe and permanent disposal of carbon dioxide and other environmentally deleterious substances in subterranean reservoirs or aquifers is commonly referred to as "sequestration". Displacement Gas EGR using a displacement agent that contains carbon dioxide or other deleterious substances provides an effective means of disposing of those substances by injecting them into a subterranean reservoir rather than releasing them to atmosphere. However, because the displacement agent will eventually "break through" at production wells and be produced back out of the reservoir along with natural gas, there is uncertainty with respect to both the net sequestration benefit to be realized from a Displacement Gas EGR process that employs environmentally deleterious substances, as well as the effect that the breakthrough of such substances may have on EGR economics.

Thus it is disclosed that the state of the art suffers from two problems that are addressed herein. Firstly, the relatively high cost of separating carbon dioxide from a typical industrial flue gas stream using currently established technology is a significant impediment both to the use of concentrated or purified $CO_2$ as a displacement agent in Displacement Gas EGR, and to the GHG emissions reduction process of sequestering concentrated or purified $CO_2$ in depleted hydrocarbon reservoirs. Secondly, the fact that the natural gas produced from a Displacement Gas EGR reservoir will eventually become contaminated by the displacement agent means both that the sequestration benefit associated with $CO_2$-based Displacement Gas EGR may eventually be compromised by the re-production of some of the $CO_2$ displacement agent along with natural gas, and that natural gas production operations and facilities must be designed to accommodate the presence of significant quantities of $CO_2$ in the natural gas production stream, which gives rise to serious concerns with respect to both product marketability and corrosion of production equipment and facilities.

Figure 3:
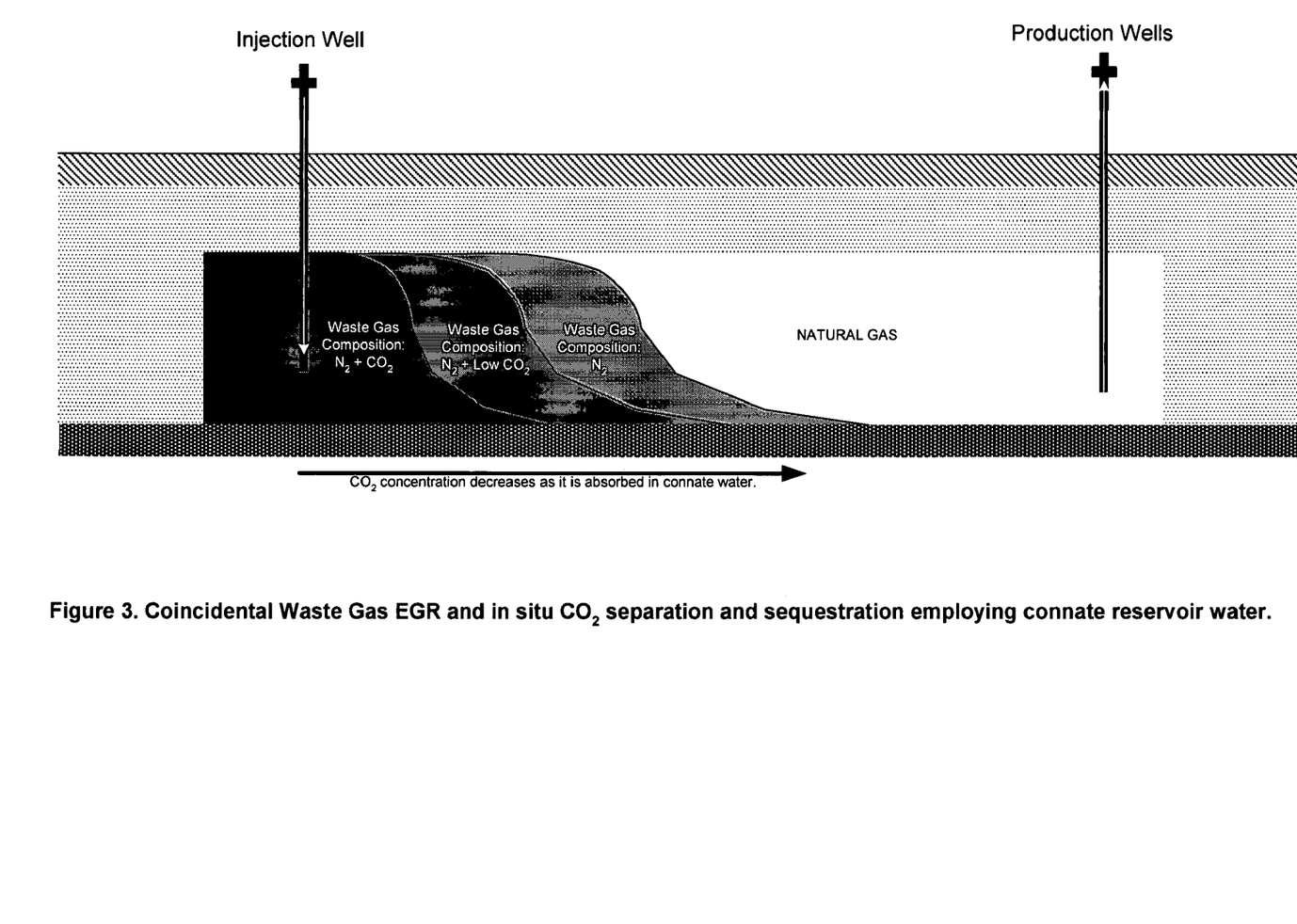
FIG. 3 is a schematic illustrating coincidental Waste Gas EGR and in situ separation and sequestration of $CO_2$ employing connate reservoir water in a relatively thin natural gas reservoir, according to one embodiment of the invention.
Figure 4:
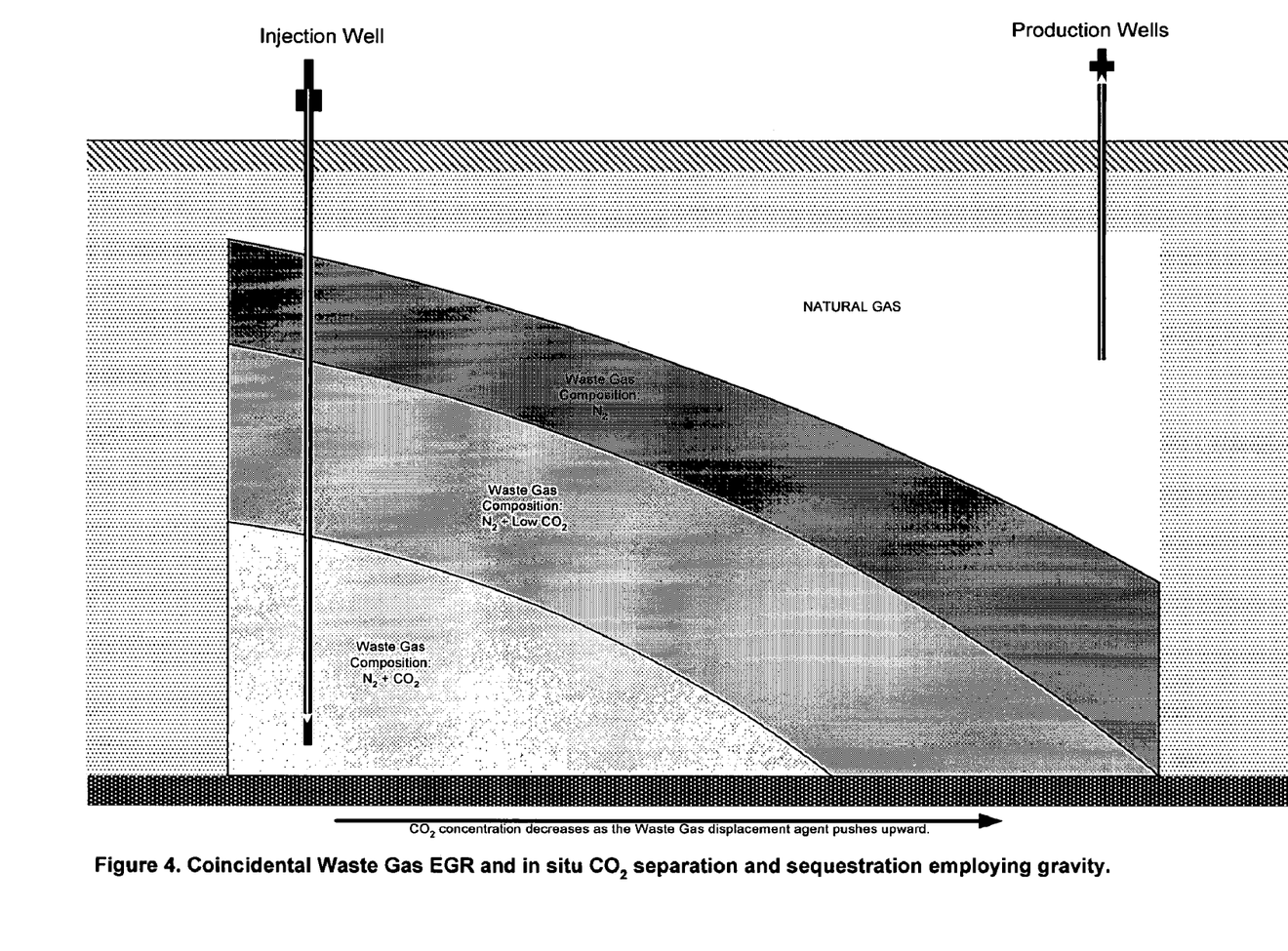
FIG. 4 is a schematic illustrating coincidental Waste Gas EGR and in situ separation and sequestration of $CO_2$ employing gravity in a vertically extensive reservoir, according to another embodiment of the present invention.

This improved method for applying Waste Gas EGR provides a cost-effective method for separating $CO_2$ out of a Waste Gas stream and retarding its advancement through the reservoir through the use of existing natural gas reservoir constituents or characteristics, such that the concentration of $CO_2$ in the displacement agent will be significantly reduced by the time the displacement agent "breaks through" at productions wells, meaning both that significant quantities of $CO_2$ can be separated out of the Waste Gas stream and sequestered in the reservoir, and that the eventual contamination of natural gas production will be primarily by environmentally benign gases such as nitrogen, with the presence of $CO_2$ in the produced natural gas stream being reduced significantly. This is achieved with Waste Gas EGR operations being designed and implemented in such a manner as to:

(i) employ the high relative solubility of $CO_2$ in combination with the presence of either connate or aquifer water in a reservoir to cause $CO_2$ to be separated out of the Waste Gas stream through absorption in reservoir water as the Waste Gas flood front advances toward production wells (FIG. 3), and/or (ii) employ the high relative specific gravity of $CO_2$ in combination with the presence of significant vertical extent in a reservoir to cause $CO_2$ to be separated out of the Waste Gas stream through the effects of gravity as the Waste Gas flood front advances toward production wells (FIG. 4), and/or (iii) employ the high relative reactivity of $CO_2$ in combination with the presence of reactive clays and other substances in a reservoir to cause $CO_2$ to be separated out of the Waste Gas stream through chemical reaction as the Waste Gas flood front advances toward production wells.

The result of designing and implementing a Waste Gas EGR scheme so as to take advantage of one or more of these methods is that, coincidental with the realization of the incremental natural gas production benefits derived from Waste Gas EGR, some or all of the $CO_2$ component of the Waste Gas stream can be separated out of that stream and retained in reservoir water, in the lower regions of the reservoir, and/or in newly formed reservoir compounds. This facilitates effective sequestration of $CO_2$ in the reservoir, as well as reducing concerns associated with the presence of $CO_2$ in natural gas produced from production wells.

Laboratory testing and computerized reservoir modelling undertaken by the Applicant have confirmed in particular that the employment of reservoir water as a natural separation medium provides an effective means of managing $CO_2$ content in a Waste Gas displacement agent, with testing and modelling demonstrating that $CO_2$ concentrations decrease progressively between an injection point and a production point when injection location and velocity are properly managed. As a result, with a Waste Gas stream comprised only of $N_2$ and $CO_2$, the initial breakthrough of the displacement agent at the production point will consist only of $N_2$, with $CO_2$ beginning to appear only once the water in contact with the displacement agent has become saturated with $CO_2$.

In addition to the problems associated with the presence of carbon dioxide in a Displacement Gas EGR displacement agent, there are also problems that arise from the presence of oxygen, sulphur dioxide and/or nitrogen oxides in a displacement agent. Oxygen and sulphur dioxide each become extremely corrosive when mixed with water, particularly in higher pressure situations, and the acids that are formed as a result of this mixing are known to cause serious corrosion problems for natural gas production equipment and facilities. In addition, oxygen in sufficient quantities mixed with hydrocarbons can give rise to the potential for explosion or combustion in the reservoir or in production equipment or facilities. In addition still, because of the environmentally deleterious nature of both sulphur dioxide and nitrogen oxides, the re-production concerns noted in respect of carbon dioxide are also applicable in respect of any sulphur dioxide or nitrogen oxides contained in a displacement agent.

There is existing technology to remove oxygen, sulphur dioxide and nitrogen oxides from industrial flue gas using equipment designed for that purpose, but this involves a net cost to the operator of the facility emitting the flue gas. Given the solubility, specific gravity and reactivity characteristics of sulphur dioxide, nitrogen oxides and oxygen relative to those of methane and nitrogen, other embodiments of the invention involve employment of the same or similar methods as discussed above in respect of carbon dioxide, to reduce or eliminate any concentrations of oxygen, sulphur dioxide or nitrogen oxides in a Waste Gas EGR displacement agent.

The specific techniques and procedures for employing natural gas reservoir constituents and characteristics to manage the separation and sequestration of carbon dioxide and other problematic substances forming part of a Waste Gas displacement agent while simultaneously conducting Waste Gas EGR operations, all with a view to balancing and optimizing the correlative performances of these coincidental activities, are in each case a function of both the composition of the Waste Gas displacement agent and the constituents and characteristics of the reservoir. Without limiting the breadth of application of the invention, some specific embodiments of the invention are as follows:

1. In the case where a natural gas formation overlies an aquifer, the Waste Gas injection well is completed so as to provide for the injection of Waste Gas into the aquifer while the natural gas production well is completed so as to provide for production of natural gas from an area above the aquifer (FIG. 5). A Waste Gas displacement agent containing $CO_2$ and $N_2$ is injected through the injection well into the aquifer, with the Waste Gas rising through the aquifer and into the natural gas formation, generating a pressure pulse and displacing methane present in the formation toward the production well. As the Waste Gas moves upward through the aquifer, $CO_2$ is absorbed in the aquifer water and thereby separated out of the Waste Gas stream, resulting in a significant reduction in the concentration of $CO_2$ in the Waste Gas displacement agent at the flood front. Because $N_2$ is also less dense than $CO_2$, separation of the $CO_2$ out of the Waste Gas displacement agent is further assisted by the relative gravity of $CO_2$ and $N_2$. When the displacement agent eventually breaks through at the production well and begins to contaminate the natural gas being produced from that well, the contamination will be exclusively or primarily by $N_2$, with the presence of $CO_2$ being substantially and advantageously reduced or eliminated.

2. In the case where a natural gas reservoir contains hydrocarbons, clays or other substances that are particularly reactive with oxygen, the oxygen removal equipment that might typically be incorporated in the facilities used to treat Waste Gas to render it suitable for use as a displacement agent are excluded, resulting in the Waste Gas displacement agent containing a small percentage of oxygen. By establishing an appropriate distance and reservoir course between injection and production wells, and thereby employing both the geochemical re-constitutions resulting from the interaction of the Waste Gas oxygen with the oxygen reactive constituents of the reservoir, as well as the moderately higher viscosity, gravity and solubility of oxygen relative to nitrogen, the oxygen in the Waste Gas displacement agent will be separated out of the Waste Gas stream as it migrates through the reservoir, resulting in a significant reduction in the concentration of oxygen in the Waste Gas displacement agent at the flood front. When the displacement agent reaches the production well, it will be fully or substantially depleted of oxygen, eliminating or reducing concerns with respect to both corrosion of production equipment and facilities, and the potential for explosion or combustion.

At this time there are few countries in the world that provide significant fiscal incentives for the reduction of GHG emissions, meaning that there is little commercial motivation to develop the facilities and systems required to capture GHGs out of industrial waste gases and sequester them in depleted or late life hydrocarbon reservoirs. Another element of the invention, being the coincidental conduct of both Waste Gas EGR operations and operations for the cost-effective separation and sequestration of environmentally deleterious substances contained in Waste Gas, is that it provides an economic platform on which to justify the cost of building facilities and systems that can readily be used for the focused capture and sequestration of such deleterious substances should emissions reduction incentives or other economic factors render such activities commercially viable. In such a case the facilities and systems established to implement the invention would represent a lowest cost means of pursuing such sequestration activities.

Pressure Maintenance for Associated Bitumen Recovery

Bitumen is a valuable yet intractable high gravity and high viscosity hydrocarbon which may be recovered from a subterranean reservoir using known methodologies that include steam assisted gravity drainage ("SAGD"). Pressure in the bitumen reservoir is a factor in the effectiveness of the recovery of bitumen using SAGD. In some cases a commercial bitumen reservoir is overlain by a natural gas reservoir having pressure communication with it. In such cases conventional production of the natural gas from the associated natural gas reservoir will reduce the pressure in that reservoir, and there is concern that such pressure reduction will adversely affect the effectiveness of SAGD bitumen recovery operations. The adverse effect on SAGD operations can be so profound as to render bitumen recovery technically difficult if not unfeasible and at the least uneconomical.

Figure 6:
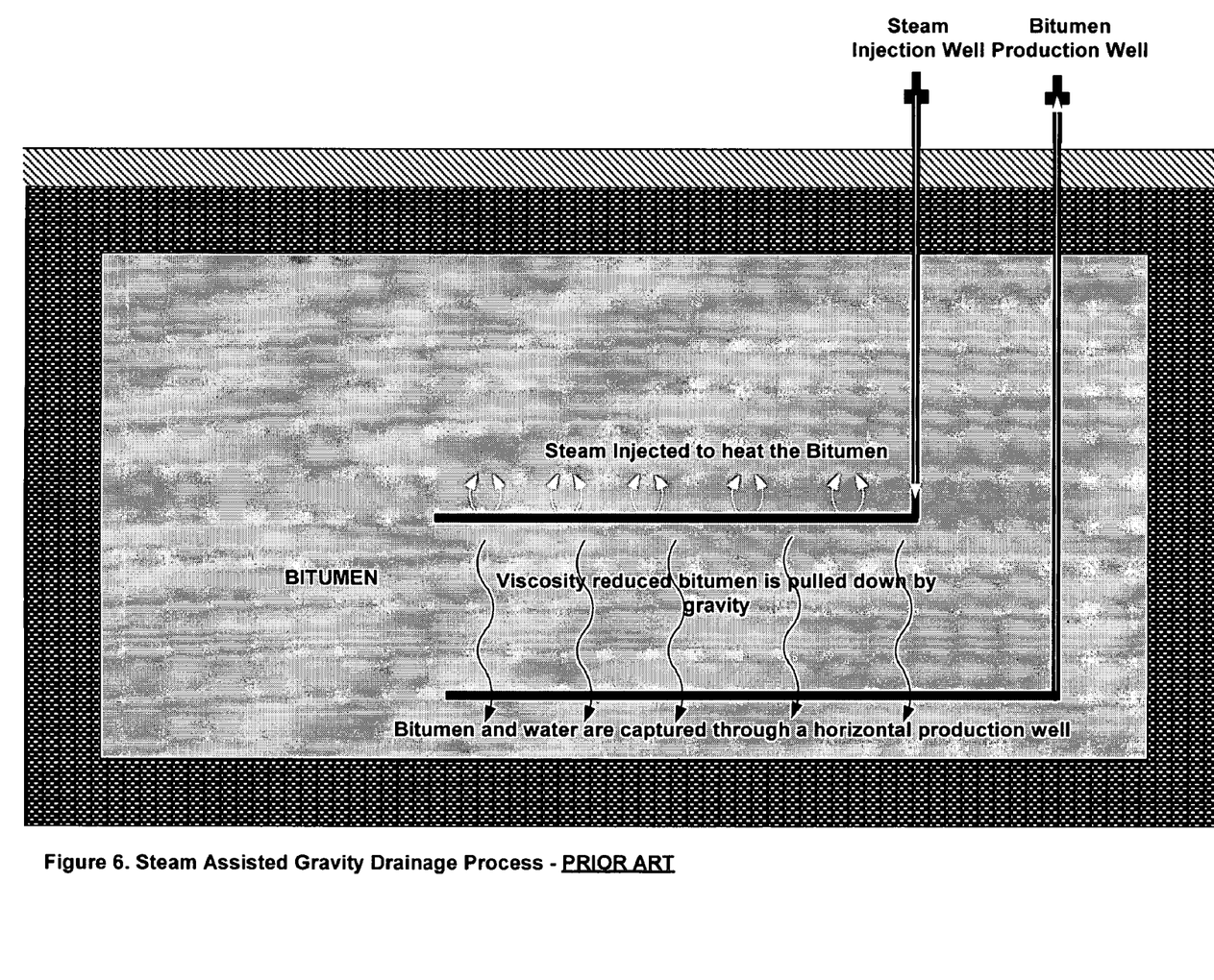
FIG. 6 is a schematic illustrating the steam assisted gravity drainage (SAGD) process for bitumen recovery, according to the prior art.

In a SAGD operation steam is injected into a bitumen deposit through a horizontal injection well. As the steam condenses, the latent heat is transferred to the bitumen, causing its temperature to rise and its viscosity to decrease, with the result that it flows downward to a horizontal production well running beneath the injection well, from which bitumen slurry is pumped to the surface (FIG. 6). SAGD performance is affected by reservoir pressure, with higher pressures generally being viewed as more favourable for SAGD operations. In situations in which the bitumen deposit is overlain by a natural gas reservoir having pressure communication with the bitumen deposit, maintaining a minimum level of pressure in the natural gas zone is considered to be critical to the effective performance of SAGD. This has been the subject of considerable analysis and discussion in the context of various Canadian regulatory hearings, and the Alberta Energy and Utilities Board's assessment of the concern is summarized in its Decision 2003-023, which can be found on its website (www.eub-.gov.ab.ca). In summary, if the natural gas reservoir pressure drops below the pressure at which SAGD operations are being conducted, steam may escape from the bitumen reservoir into the pressure depleted natural gas reservoir, reducing the SAGD effectiveness. To prevent steam loss into the gas zone the steam injection pressure would have to be reduced to match the gas zone pressure, which could adversely affect SAGD efficiency. Lowering SAGD operating pressures also involves other complications. In particular, the artificial lift systems currently employed to lift the fluid bitumen/water mix to the surface in SAGD operations require certain minimum steam chamber pressures in order to be technically feasible. In addition, depressuring may increase the risk of water influx and/or solution gas evolution.

One of the solutions under consideration for this problem is referred to as repressurization. This would involve producing natural gas from an associated natural gas reservoir until it is substantially depleted, and then repressuring the reservoir by way of injection of some gas less valuable than methane, such as carbon dioxide, nitrogen, flue gas or air. The Alberta Energy and Utilities Board has expressed reservations about this solution primarily because of the possibility that the depressuring of the natural gas reservoir might result in adverse changes that are not reversible by repressurization. Water influx and solution gas evolution are two of the specific concerns that have been raised in this respect.

Further, as set forth in various technical information sessions, including those of the Alberta Research Council and the Petroleum Technology Alliance Canada (www.ptac.org), solutions to date focus heavily on technological advancements in the mechanical pumps that are used to extract the bitumen slurry from the reservoir.

In spite of the combined capabilities of the industries seeking to exploit both the gas and bitumen assets, no satisfactory solution has been identified thus far.

Figure 7:
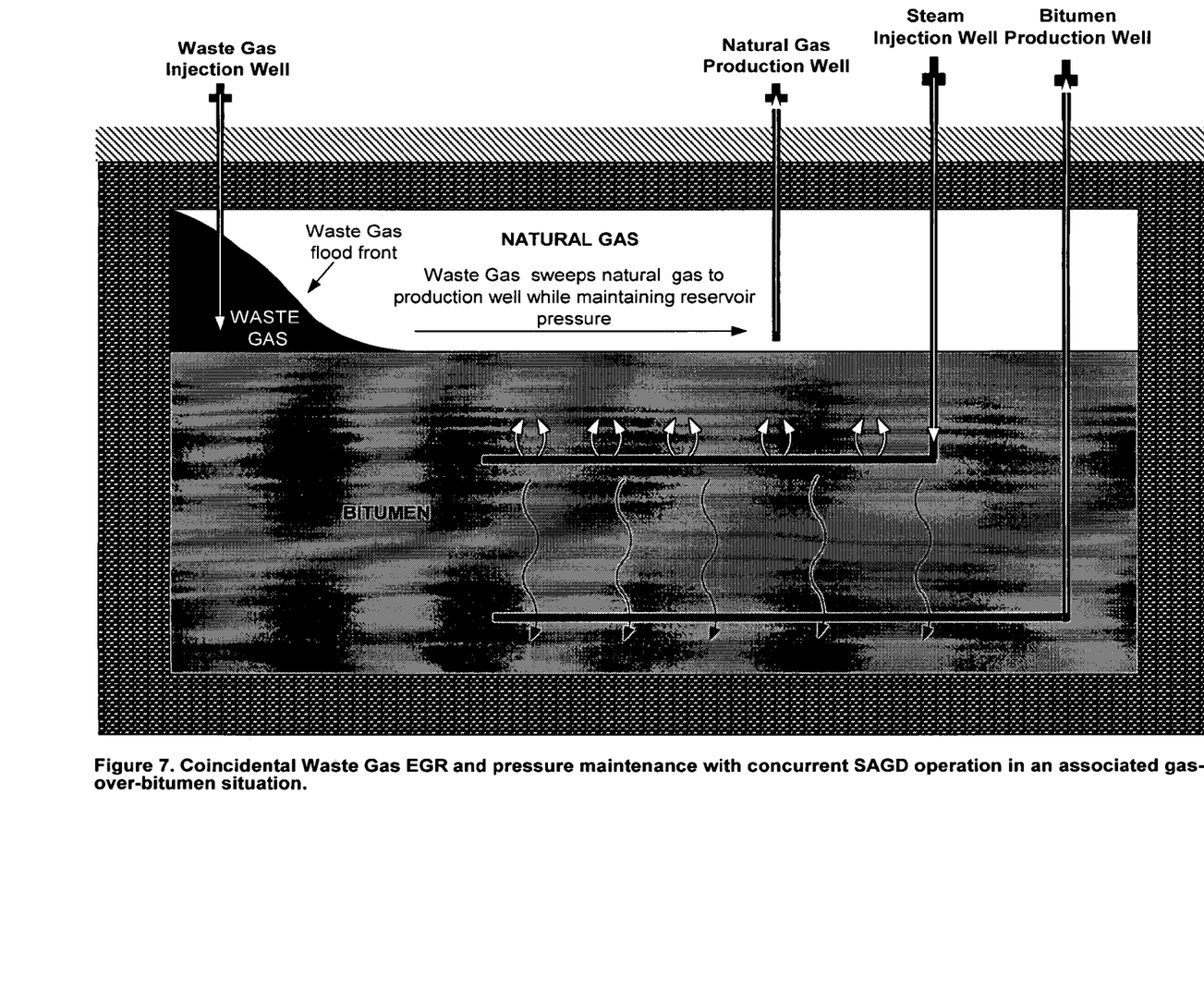
FIG. 7 is a schematic illustrating coincidental Waste Gas EGR and pressure maintenance to facilitate concurrent SAGD operations in an associated gas-over-bitumen situation, according to another embodiment of the present invention.

In contradistinction to the proposed practice of repressurization, or to enhance bitumen slurry lift capability, Applicant has discovered a solution to facilitate production of the associated natural gas without adversely affecting SAGD operation pressures. The preferred embodiment of this invention provides a solution to facilitate associated natural gas production in that it will allow associated natural gas to be produced without any reduction in reservoir pressure, through displacement of such natural gas with Waste Gas (FIG. 7). Using this pressure maintenance method alleviates the water influx and solution gas evolution concerns associated with the repressurization method noted above, while coincidentally providing a means for increasing total natural gas recoveries over those that would be realized through primary production alone. It also optionally provides a means for increasing the natural gas reservoir pressure to levels above the current level should circumstances warrant. This process also alleviates the risk that producible natural gas left in place pending completion of SAGD operations might be contaminated as a result of steam seepage from SAGD operations. This coincidental Waste Gas EGR and pressure maintenance methodology may be applied so as to enable either concurrent natural gas production and SAGD operation, or sequential natural gas production and SAGD operation, with natural gas production operations being conducted prior to the commencement of SAGD operations.

There may be other bitumen recovery processes that are sensitive to pressure depletion, such as in-situ solvent recovery processes. Herein SAGD is often referred to, but is not intended to limit the type of pressure sensitive bitumen recovery process that may benefit from application of the invention.

Because of concerns with respect to potential contamination of natural gas production, it will typically be preferable to implement Waste Gas EGR in the later stages of a conventional natural gas reservoir's primary production life. In a gas-over-bitumen context this consideration will have to be balanced with minimum reservoir pressure considerations for SAGD operations. Contrary to conventional wisdom and economic analysis, in some cases the methodology of the present invention may result in the application of Waste Gas EGR techniques earlier in the production life of the natural gas reservoir.

Recovery of bitumen is made difficult by its high viscosity, which prevents it from flowing freely to production wells. Miscible flooding with various agents, including carbon dioxide, is a well established means of reducing viscosity and improving flow for oil, and has been considered and tested for bitumen. In the case of a natural gas reservoir in contact with a bitumen deposit, where Waste Gas EGR is applied to the natural gas reservoir using a Waste Gas displacement agent that includes carbon dioxide, further benefits may be realized through management of the Waste Gas injection process to cause at least a portion of the $CO_2$ in the Waste Gas to come in contact with and be dissolved into the bitumen, thus reducing the viscosity and improving the flow capability of the bitumen so affected. In another embodiment of this invention, therefore, the process assists in reducing viscosity and improving the flow capability of bitumen within or in contact with a natural gas reservoir, through dissolution of $CO_2$ in the bitumen.

In a broad aspect of the invention, a process is provided for the production of natural gas from a natural gas formation having a water presence and overlying and being in pressure communication with a bitumen reserve, the natural gas production being non-detrimental to pressure sensitive operations for the recovery of the bitumen resource, the process comprising:

providing at least one Waste Gas injection well and at least one natural gas production well, each completed in the natural gas formation;

injecting Waste Gas into the natural gas reservoir through the injection well(s) at a pressure and rate that causes the pressure in the natural gas reservoir to be maintained or increased notwithstanding the production of natural gas from the reservoir, and producing natural gas from the production well(s) without causing any reduction in reservoir pressure, thereby preserving or improving the pressure condition of the reservoir for concurrent or subsequent pressure sensitive operations for the recovery of the bitumen resource;

optionally, either concurrently or subsequently producing bitumen from the bitumen reserve using SAGD or other processes;

optionally, using a Waste Gas displacement agent that contains carbon dioxide, and conducting Waste Gas EGR injection operations so as to employ the connate or aquifer water in or in contact With the natural gas reservoir to cause carbon dioxide to be separated out of the Waste Gas displacement agent through preferential absorption in such water, with the result that carbon dioxide is thereby both retarded from flowing to the natural gas production well(s) and effectively sequestered in the reservoir water; and optionally, using a Waste Gas displacement agent that contains carbon dioxide, and conducting Waste Gas injection operations so as to cause some of the carbon dioxide in the Waste Gas displacement agent to come in contact with and be dissolved in bitumen, thereby reducing the viscosity and improving the flow capability of such bitumen.

In a preferred alternate embodiment of the invention, natural gas is produced under primary production at diminishing formation pressure until a predetermined pressure threshold is reached. Following primary production, secondary production of natural gas is conducted using Waste Gas EGR in such a manner as to maintain a pressure in the natural gas formation above the minimum bitumen recovery operational pressure. At any time before, during or after the conduct of Waste Gas EGR operations, bitumen recovery is commenced, resulting in co-production of natural gas and bitumen.

Surprisingly, Applicant has discovered that application of Waste Gas EGR techniques enables production of natural gas without compromising the concurrent or subsequent production of bitumen using conventional recovery techniques including SAGD, and Applicant has further found there to be additional synergistic effects on the bitumen reservoir resulting in enhanced production of both natural gas and of bitumen which can exceed the nominal production of either hydrocarbon resource independently.

Management of Aquifer Influenced Reservoirs

Many conventional natural gas reservoirs are influenced by the presence of an aquifer underlying or laterally bordering the reservoir. As pressure in the reservoir is reduced through conventional primary natural gas production, the aquifer is able to advance into the reservoir, often choking off natural gas production from production wells, and trapping natural gas in pore spaces or pockets of varying sizes within the reservoir.

This improved method for applying Waste Gas EGR provides an effective means of mitigating the adverse effects on natural gas recoveries resulting from aquifer-related water influx caused by reservoir depressurization. There are two broad components of the invention, the first providing a solution for the problem of water "coning" in natural gas wells, and the second providing a solution for the problem of trapped gas.

In the first broad embodiment of the invention, Waste Gas EGR operations are commenced as soon as reasonably practicable following recognition of the fact that the depressurization of the reservoir through natural gas production is causing aquifer influenced water influx. Because production contamination concerns will typically mean that it is preferable to commence Waste Gas EGR operations late in the production life of a natural gas reservoir, it will be necessary to balance the countervailing considerations of water influx and production contamination in determining the optimal time at which to commence Waste Gas EGR operations. By commencing such operations earlier in the production life of the reservoir, aquifer influenced water influx may be retarded, and even reversed, through the maintenance or increase of reservoir pressure, allowing natural gas to continue to flow to the completion sections of production wells that would otherwise be choked off as a result of water influx. Coincidentally, the Waste Gas EGR process causes natural gas in the reservoir to be swept toward production wells through both pressure pulse and physical displacement, with the result that natural gas production is enhanced through both the Waste Gas EGR sweep mechanism and the preservation of the production capability of production wells that would otherwise be choked off by water encroachment.

In the second broad embodiment of the invention, Waste Gas EGR operations are commenced after the point at which aquifer influenced water encroachment has caused natural gas to be isolated or "trapped" in bubbles or pockets within the area of water influence. Water encroachment into the natural gas reservoir may cause natural gas to be trapped at a microscopic, mesoscopic or macroscopic level, but in each case the trapped gas accumulation has become disconnected and is unable to flow to production wells due to the water encroachment. By injecting Waste Gas into the area of water influx the bubbles or pockets of trapped gas can be re-connected, allowing them to flow to production wells.

In both broad embodiments of the invention contamination of natural gas production with the Waste Gas displacement agent will be a more significant factor than in a typical Waste Gas EGR project involving a conventional pressure depleting natural gas reservoir not suffering from aquifer encroachment. The reason for this in the case of the first broad embodiment is that Waste Gas EGR operations will be commenced earlier in the production life of the reservoir than would typically be considered optimal, resulting in a higher percentage of the natural gas in the reservoir becoming contaminated by the Waste Gas displacement agent. In the case of the second broad embodiment the reason for this is that the process for re-connecting the bubbles or pockets of trapped gas involves at least some commingling of the Waste Gas displacement agent with the trapped gas, meaning that a significant portion of the trapped gas that is ultimately recovered will be contaminated with the Waste Gas displacement agent. Fortunately the Applicant has discovered that the preferential absorption principles referred to under the preceding section entitled "In Situ Management of Problematic Substances Contained in Waste Gas" can be employed to cause the concentrations of carbon dioxide and other problematic substances in the Waste Gas displacement agent to be reduced as the agent migrates through the water influenced areas of the reservoir, with the result that natural gas production contamination will be primarily or exclusively by nitrogen, an environmentally and operationally benign substance.

Horizontal Wells

A further improved method for applying Waste Gas EGR involves the use of horizontal wells for either Waste Gas injection or natural gas production.

Employing a horizontal injection well in Waste Gas EGR provides for a broader flood front and a corresponding improvement in sweep effectiveness. In the case of a Waste Gas displacement agent containing carbon dioxide or other problematic substances it also provides greater exposure to any reservoir water or other reservoir constituents that may be employed to reduce the concentrations of such problematic substances as the displacement agent migrates towards production wells.

Figure 8:
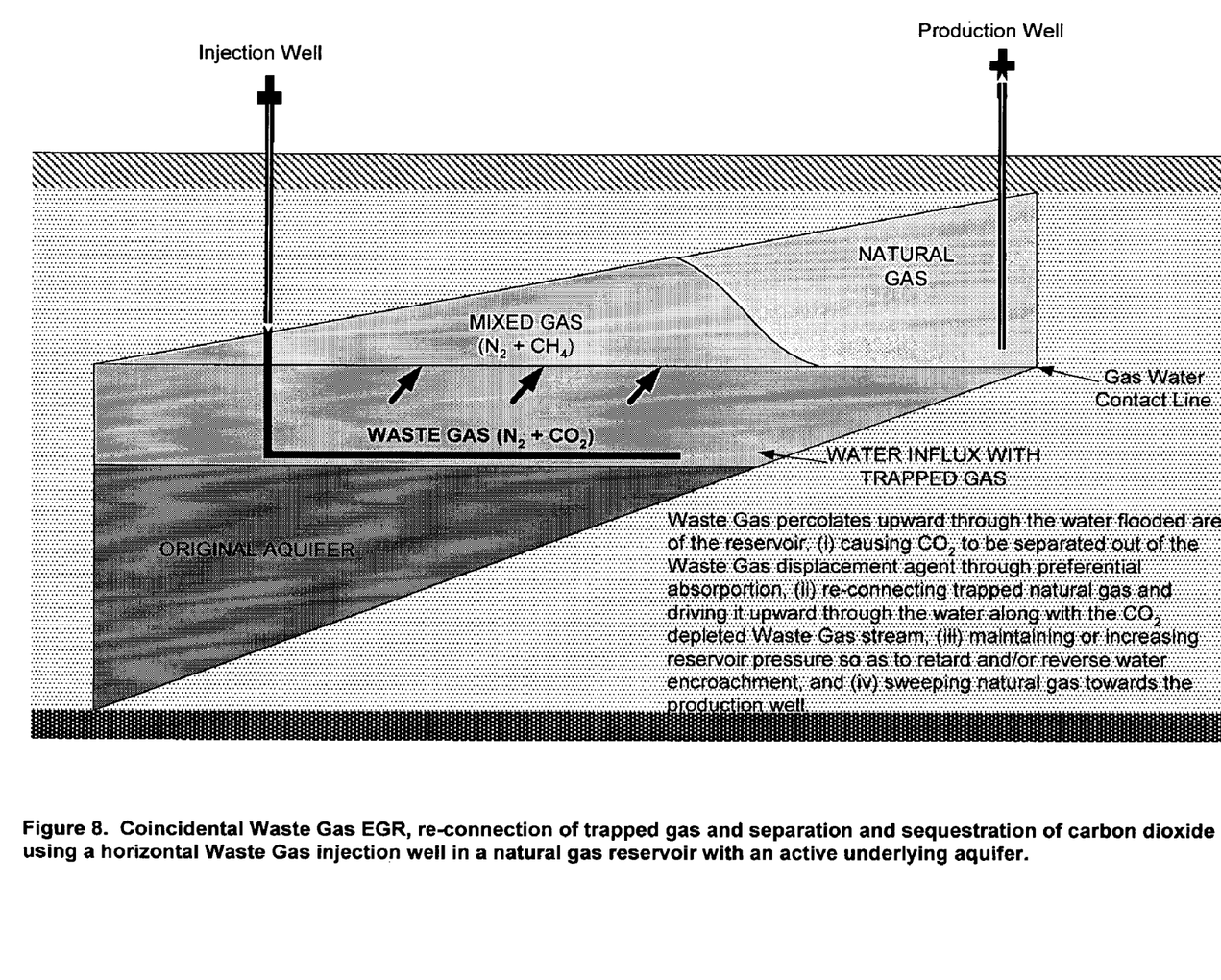
FIG. 8 is a schematic illustrating the use of a horizontal Waste Gas injection well to increase the exposure of the Waste Gas displacement agent to both trapped gas and reservoir water, according to another embodiment of the present invention.

One embodiment of this improved method would be the use of a horizontal injection well in a situation in which it is desirable both to re-connect trapped gas in a water flooded region of an aquifer influenced reservoir, and to separate and sequester carbon dioxide from the Waste Gas displacement agent. These objectives can both be more effectively accomplished by employing a horizontal leg on the Waste Gas injection well, providing significantly increased Waste Gas exposure to both trapped gas and reservoir water (FIG. 8). In this situation natural gas recoveries would also benefit from the water encroachment retardation that would result from maintaining or increasing reservoir pressure through Waste Gas injection.

Synergistic Systems

A system for the concurrent or sequential production of gaseous hydrocarbons realizes a number of synergistic effects which act to enhance the individual operations when practiced at adjacent locations at a gaseous reservoir overlying a bitumen reservoir. In an example of such as system one can comprise:

a gas production well and a gas injection well in the gas formation;

a bitumen production well and a steam injection well in the bitumen formation in a SAGD configuration;

a dehydrator system for removing water from produced gas, the water produced being used to support steam generation for the SAGD operation;

a compressor unit for compression of waste gas for injection in the gas injection well, the compressor providing a source of waste heat to be used to support steam generation for the SAGD operation; and a combustion unit for the combustion of at least a portion of the produced gaseous hydrocarbons so as to provide a source of waste gas for waste gas injection and a source of heat for steam generation for the SAGD operation.

Additional apparatus may be provided to perform functions integral to either gas production and treatment or bitumen recovery and treatment. In each case, waste heat, waste gas and water produced by any of these apparatus may be used to enhance the continued production of either or both of gas and bitumen.

TABLE 1

Physical Properties of Natural Gas and Waste Gas

| Substance | Molecular Weight | Specific Gravity* | Viscosity (cP)** | Solubility in $H_2O$ (cc/100 gm $H_2O$)** |
|---|---|---|---|---|
| $CH_4$ | 16 | 0.55 | 0.011 | 0.4 |
| $N_2$ | 28 | 0.87 | 0.018 | 1.6 |
| $CO_2$ | 44 | 1.53 | 0.015 | 90.1 |
| $O_2$ | 32 | 1.10 | 0.021 | 3.3 |
| $SO_2$ | 64 | 2.26 | 0.013 | 15.0 |
| $N_2O$ | 44 | 1.52 | — | 61.0 |
| $NO_2$ | 46 | 1.59 | — | — |

*Relative to air at 20° C. and 1 atmosphere
**At 20° C. and 1 atmosphere, noting that relative viscosity and solubility do not change significantly as pressure is increased from atmospheric to reservoir pressure, but the viscosity of $CO_2$, $N_2$, and $O_2$ increase more quickly than that of $CH_4$ as temperatureis increased.

We claim:

1. A process for the removal of a carbon dioxide constituent from a waste gas comprising a composition of constituents including carbon dioxide and another constituent, the carbon dioxide constituent being retained in a subterranean reservoir having a water presence, the process comprising:

providing at least one injection well and at least one production well, each completed in the reservoir;

injecting the waste gas through the at least one injection well;

separating at least some of the carbon dioxide constituent out of the waste gas by the water presence, a separated carbon dioxide constituent being retained in the water presence for retarding the movement of the separated carbon dioxide constituent towards the at least one production well; and producing gas from the at least one production well, the produced gas being substantially free of the separated carbon dioxide constituent.

2. The process of claim 1 wherein the subterranean reservoir is a natural gas reservoir further comprising:

displacing natural gas towards the at least one production well by the waste gas injection; and producing natural gas from the at least one production well, the natural gas being substantially free of the separated carbon dioxide constituent.

3. The process of claim 2 wherein the injection of waste gas is intermittent.

4. The process of claim 2 wherein the one or more injection wells are completed in the reservoir at an elevation sufficiently below the elevation at which the at least one production well is completed wherein gravity aids in the separation and retaining of the carbon dioxide constituent.

5. The process of claim 2 wherein the reservoir further comprises reactive clays which aid in the separation and retention of the carbon dioxide constituent.

6. The process of claim 2 further comprising injecting waste gas while production of natural gas is suspended or intermittent.

7. The process of claim 2 wherein the natural gas reservoir is in pressure communication with a bitumen resource containing bitumen the recovery of which may be adversely affected by reduction of pressure in the natural gas reservoir, comprising injecting waste gas through the at least one injection well and maintaining a pressure in the reservoir wherein, notwithstanding the production of natural gas from the reservoir, the pressure in the reservoir remains sufficient for recovery of bitumen from the bitumen resource.

8. The process of claim 7 further comprising injecting the waste gas through the at least one injection well and increasing the pressure in the reservoir.

9. The process of claim 7 wherein the injection of waste gas is intermittent.

10. The process of claim 7 further comprising injecting the waste gas while production of natural gas is suspended or intermittent.

11. The process of claim 7 further comprising recovering bitumen from the bitumen resource, wherein bitumen is recovered either concurrently with the production of natural gas or after the production of natural gas.

12. The process of claim 11 wherein the recovering of the bitumen is by steam assisted gravity drainage (SAGD).

13. The process of claim 7 further comprising displacing the injected waste gas to the bitumen resource for dissolving at least some of the carbon dioxide in the bitumen for aiding in the recovery of the bitumen.

14. The process of claim 2 wherein the natural gas reservoir is affected by an active water aquifer encroaching into the reservoir further comprising:

completing the at least one injection well at about a location in the reservoir at which aquifer water is encroaching into the reservoir, and injecting the waste gas through the at least one injection well to retard the encroachment of aquifer water toward the at least one production well.

15. The process of claim 14 wherein the injection of waste gas is intermittent.

16. The process of claim 14 further comprising injecting the waste gas while production of natural gas is suspended or intermittent.

17. The process of claim 2 wherein the natural gas reservoir is affected by an active water aquifer that has encroached into the reservoir and isolating at least some natural gas in one or more accumulations in the reservoir, comprising:

completing the at least one injection well at about a location in the reservoir that has been affected by aquifer water encroachment; and injecting waste gas through the at least one injection well to displace the accumulations of natural gas through the aquifer water toward the at least one production well.

18. A process for the production of natural gas from a natural gas reservoir having a reservoir pressure, the reservoir being in pressure communication with a bitumen resource containing bitumen, the process comprising:

providing at least one injection well and at least one production well, each completed in the natural gas reservoir;

producing natural gas from the at least one production well; and injecting a waste gas through the at least one injection well and maintaining a reservoir pressure wherein, notwithstanding the production of natural gas from the reservoir, the reservoir pressure remains sufficient for the recovery of bitumen from the bitumen resource.

19. The process of claim 18 further comprising displacing natural gas towards the at least one production well by the waste gas injection.

20. The process of claim 19 further comprising injecting the waste gas through the at least one injection well to increase the pressure in the reservoir.

21. The process of claim 19 further comprising injecting the waste gas while production of natural gas is suspended or intermittent.

22. The process of claim 19 wherein the injection of waste gas is intermittent.

23. The process of claim 19 further comprising recovering bitumen from the bitumen resource, wherein bitumen is recovered either concurrently with the production of natural gas or after the production of natural gas.

24. The process of claim 23 wherein the recovering of the bitumen is by steam assisted gravity drainage (SAGD).

25. The process of claim 23 wherein the waste gas has a composition of constituents including carbon dioxide, the process further comprising displacing the injected waste gas to the bitumen for dissolving at least some of the carbon dioxide constituent in the bitumen for aiding in the recovery of the bitumen.

26. The process of claim 19 wherein the natural gas reservoir has a water presence and the waste gas has a composition of constituents including carbon dioxide and another constituent, the process further comprising:

separating at least some of the carbon dioxide constituent out of the waste gas by the water presence, a separated carbon dioxide constituent being retained in the water presence for retarding the movement of the separated carbon dioxide constituent towards the at least one production well; and producing natural gas from the at least one production well, the natural gas being substantially free of the separated carbon dioxide constituent.

27. A process for the enhanced production of natural gas from a natural gas reservoir having a reservoir pressure, the reservoir affected by an active water aquifer encroaching into the reservoir comprising:

providing at least one injection well and at least one production well, each completed in the reservoir completing the at least one injection well at about a location in the reservoir at which aquifer water is encroaching into the reservoir;

injecting waste gas through the at least one injection well to displace natural gas towards the at least one production well and retard the encroachment of aquifer water toward the at least one production well; and producing natural gas from the at least one production well.

28. The process of claim 27 wherein the waste gas comprises a composition of constituents including carbon dioxide and another constituent, the process further comprising separating at least some of the carbon dioxide constituent out of the waste gas by the aquifer water and retaining a separated carbon dioxide constituent in the aquifer water for retarding the movement of the separated carbon dioxide constituent towards the at least one production well.

29. The process of claim 27 wherein the injection of waste gas is intermittent.

30. The process of claim 27 further comprising injecting the waste gas while production of natural gas is suspended or intermittent.

31. The process of claim 27 further comprising completing the at least one injection well at about a location in the reservoir into which aquifer water has already encroached.

32. The process of claim 27 further comprising injecting the waste gas through the at least one injection well to maintain or increase the pressure in the reservoir.

33. The process of claim 27 wherein aquifer water has encroached into the reservoir, isolating at least some natural gas in one or more accumulations in the reservoir, further comprising:

completing the at feast one injection well at about a location in the reservoir that has been affected by aquifer water encroachment; and injecting waste gas through the at least one injection well to displace the isolated accumulations of natural gas through aquifer water toward the at least one production well.

34. The process of claim 27 wherein the injection well is a horizontal injection well further comprising injecting the waste gas from the horizontal injection well for establishing a broad front for displacing natural gas towards the at least one production well and retarding water encroachment.

35. The process of claim 28 wherein the another constituent of the waste gas comprises an oxygen constituent and the reservoir contains oxygen reactive substances, further comprising establishing an effective distance between the at least one injection well and the at least one production well whereby at least some of the oxygen constituent is separated out of the waste gas by reaction with the oxygen reactive substances, a separated oxygen constituent being retained with the oxygen reactive substances for retarding the movement of the separated oxygen constituent towards the at least one production well.

* * * * *

UNITED STATES PATENT AND TRADEMARK OFFICE
CERTIFICATE OF CORRECTION

| | | |
|---|---|---|
| PATENT NO. | : 7,172,030 B2 | |
| APPLICATION NO. | : 10/957582 | |
| DATED | : February 6, 2007 | |
| INVENTOR(S) | : W. Norval Horner et al. | |

It is certified that error appears in the above-identified patent and that said Letters Patent is hereby corrected as shown below:

On the Title Page (73) the name of the Assignee should read as --Beauvert Gas Services Ltd.--

Signed and Sealed this

Tenth Day of April, 2007

JON W. DUDAS
*Director of the United States Patent and Trademark Office*